United States Patent [19]

Singh et al.

[11] Patent Number: 5,136,016

[45] Date of Patent: Aug. 4, 1992

[54] MELT-PROCESSIBLE AROMATIC POLYAMIDE FROM N,N'-ISOPHTHALOYL BIS LACTAM

[75] Inventors: Gurdial Singh, Hockessin, Del.; Andrew J. Sitter, Mechanicsville; Beth E. Dunlap, Richmond, both of Va.; Mark F. Teasley, Wilmington, Del.

[73] Assignee: E. I. Du Pont de Nemours and Company, Wilmington, Del.

[21] Appl. No.: 629,656

[22] Filed: Dec. 14, 1990

Related U.S. Application Data

[63] Continuation-in-part of Ser. No. 402,295, Sep. 5, 1989, abandoned, which is a continuation-in-part of Ser. No. 257,548, Oct. 14, 1988, abandoned.

[51] Int. Cl.⁵ ............................................. C08G 69/36
[52] U.S. Cl. ..................... 528/324; 524/606; 528/183; 528/184; 528/185; 528/211; 528/323; 528/329.1; 528/331
[58] Field of Search .................. 528/324, 329.1, 323, 528/331, 183, 184, 185, 211; 524/606

[56] References Cited

U.S. PATENT DOCUMENTS 3,759,877  9/1973  Huhn et al. ..................... 260/78 A
3,983,306  9/1976  Nielinger et al. ................ 428/474

FOREIGN PATENT DOCUMENTS 45-19714  5/1970  Japan .
57-114575  6/1982  Japan .

OTHER PUBLICATIONS

Synthesis of alpha-alkyl- or aryl-N-(omega-aminotetramethylene)-upsilon-valerolactams and corresponding bislactams, Arm. Khim. ZH. 1974, 27(10) 868-71.

*Primary Examiner*—Harold D. Anderson

[57] ABSTRACT

Melt-processible aromatic polyamides are obtained by reacting certain N,N'-isophthaloyl bis(lactam) compounds with certain aromatic diamines.

11 Claims, No Drawings

MELT-PROCESSIBLE AROMATIC POLYAMIDE FROM N,N'-ISOPHTHALOYL BIS LACTAM

RELATED APPLICATIONS

This application is a continuation-in-part of application Ser. No. 07/402,295, filed Sep. 5, 1989, which is a continuation-in-part of application Ser. No. 07/257,548, filed Oct. 14, 1988, both now abandoned.

BACKGROUND OF THE INVENTION

Aramids are generally high temperature polymers. The commercial aramids, poly(m-phenylene isophthalamide) and poly(p-phenylene terephthalamide) are thermally stable polymers which on heating decompose before they melt. Hence, they are processed from solutions containing a minor proportion of polymer and, in the case of the meta aramid, large amounts of salt, such as $CaCl_2$. They may be prepared by the acid chloride route which consists of reacting, for example, isophthaloyl chloride or terephthaloyl chloride, with an aromatic diamine, such as m-phenylene diamine in the presence of a solvent. In the manufacture of poly(m-phenylene isophthalamide), the HCl generated in the reaction is neutralized with a base such as $Ca(OH)_2$. The poly(m-phenylene isophthalamide) solution is then dry spun.

The acid chloride route is used for the synthesis of aramids because the normal melt condensation of aromatic diamines with aromatic dibasic acids does not occur or results in low molecular weight, infusible materials. The acid chloride route, on the other hand, has its own drawbacks such as (1) the chloride-related corrosion of equipment, and (2) the need to remove solvent and salts from fiber. Further, the polymers made by the acid-chloride route are usually non-meltable and thus are not melt-processible.

A worthwhile objective has been to prepare a salt-free aramid or aramid copolymer by a melt process. Such polymers and copolymers have the high glass transition temperature, $T_g$, and good thermal stability of aramids and, at the same time, have the advantages of low cost melt-processibility to give products free of salt for superior electrical properties.

Because of their high thermal stability, and good electrical properties, aramid fibers are used to prepare variety of thermally resistant products, such as fire blocking fabrics and papers for electrical insulation in motors.

SUMMARY OF THE INVENTION

This invention provides a melt-processible amorphous polyamide having an inherent viscosity of at least 0.5 and consisting essentially of the following repeat units:

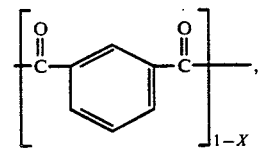

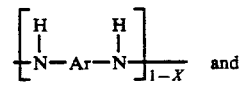

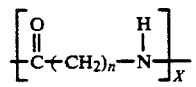

wherein n is 4 or 5; with the proviso that when n is 4, X is from 0.05 to 0.25, and, when n is 5, X is from 0.1 to 0.45; and when n is 4, Ar is selected from the group consisting of
a) 3,4'-oxydiphenylene or a mixture thereof with up to 75 mol percent of 1,3-phenylene or 4,4'-oxydiphenylene or with up to 35 mol percent of 1,4-phenylene;
b) a mixture of from 65 to 75 mol percent 1,3-phenylene and from 25 to 35 mol percent of 1,4- phenylene;
c) a mixture of 20 to 80 mol percent 4,4'-oxydiphenylene and from 20 to 80 mol percent of 1,3-phenylene; and when n is 5, Ar is selected from the group consisting of
a) 3,4'-oxydiphenylene or a mixture thereof with up to 80 mol percent of 4,4'-oxydiphenylene, up to 90 mol percent of 1,3-phenylene, or up to 50 mol percent of 1,4-phenylene;
b) a mixture of 50 to 90 mol percent 1,3-phenylene and 10 to 50 mol percent of 1,4-phenylene Also included in the invention are melt-processible compositions of such polyamides plasticized with a lactam of the group of caprolactam and valerolactam. Preferred polyamides of the invention have an inherent viscosity of at least 0.7 measured as described hereinafter.
c) a mixture of 10 to 90 mol percent 1,3-phenylene and 10 to 90 mol percent of 4,4'-oxydiphenylene; and
d) a mixture of 60 to 75 mol percent 4,4'-oxydiphenylene and 25 to 40 mol percent of 1,4-phenylene;

DETAILED DESCRIPTION OF THE INVENTION

This invention relates to a new class of polyamides and to their preparation by the reaction of certain N,N'-isophthaloyl bis(lactam) monomers with certain aromatic diamines as depicted below for the bis(caprolactam) or bis(valerolactam):

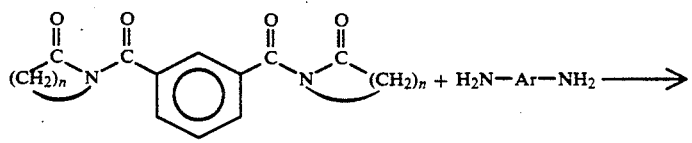

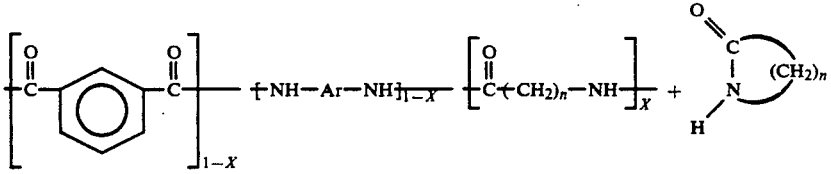

wherein n, X and Ar are as defined above. The preferred polymer of the invention is the copolymer consisting of the following units and in the bis(valerolactam) is employed:

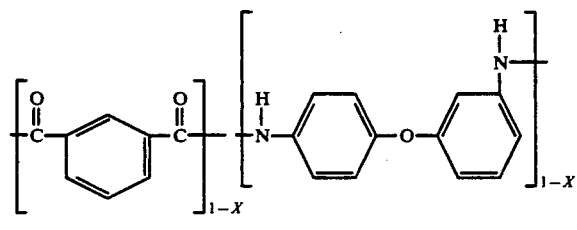

and

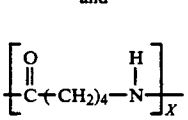

where X is as above. The bis(lactam)monomers used are N,N'-isophthaloyl bis(valerolactam) (IBV) (n=4) N,N'-isophthaloyl bis(caprolactam) (IBC)(n=5).

The aromatic diamines employed are m-phenylene diamine (MPD), p-phenylene diamine (PPD), 3,4' -diaminodiphenyl ether (3,4'-DDE), or 4,4'-diaminodiphenyl ether (4,4'-DDE). As indicated above, these diamines are generally used as mixtures.

When mixtures of diamines are employed, the repeat

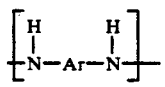

units represent the diamino radicals derived from each of the diamines and in substantially the molar proportions in which they are present in the mixture. Thus, if a single diamine such as 3,4'-DDE is employed, the repeat unit is

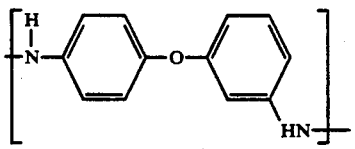

and when a 50/50 mol percent mixture of 3,4'-DDE and 4,4'-DDE is employed, the repeat units are

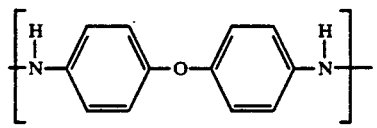

and

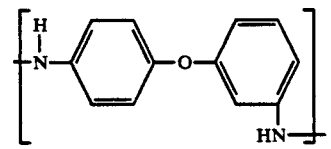

in equimolar proportions.

The resulting polymers are produced in plasticized form by the in situ generated lactams, which may be extracted from the polymers, if desired. Both the plasticized polymers and the polymers from which the lactam has been extracted are melt-processible into fibers, films, and shaped forms. By "melt-processible" is meant that the polyamides can be melt-spun into fibers, melt-pressed into clear pliable films or melt-extruded into shaped forms without undue degradation.

Preparation of IBC, and IBV

IBC was prepared by the following procedure: A 2-liter, three-neck flask was fitted with a mechanical stirrer, reflux condenser, and a dropping funnel. The apparatus was thoroughly dried under N2. To the flask were charged 113 g (1.0 mol) of caprolactam, 101 g (1.0 mol) of triethylamine, and 500 ml of toluene The mixture was stirred and cooled in ice. A solution of 101.5 g (0.5 mol) of isophthaloyl chloride in 150 ml of toluene was added dropwise over a period of about 40 min. and after the addition was complete, the reaction mixture was stirred at room temperature for 30 min. and then filtered. The white solid was air dried, washed by stirring in 200 ml of water to remove Et3NH+Cl— and then filtered and washed twice on the filter paper using 1000 ml of distilled water each time. The solid was dried overnight in a vacuum oven at 80° C.; yield 154 g (86.5%). Its melting point was 139°–140° C.

IBV was prepared by the following procedure:
A 3-liter, three-neck flask was fitted with a mechanical stirrer, reflux condenser, and a dropping funnel. The apparatus was thoroughly dried under nitrogen. To the flask were charged 149 g (1.5 mols) of valerolactam (2-piperidone), 152 g (1.5 mols) of triethylamine, and 750 ml of toluene. The mixture was stirred A solution of 152 g (0.75 mol) of isophthaloyl chloride in 250 ml of toluene was added dropwise over a period of about 30 min. After the addition was complete, during which the reaction became quite hot, the reaction mixture was stirred for several hours until it became cool. Then it was allowed to stand overnight without further stirring. The slurry was vacuum filtered, the filter cake was washed with a small amount of toluene (sufficient to wet the entire cake), and then it was aspirated dry. The reaction flask was rinsed with a liter of water into the filter cake to dissolve the triethylamine hydrochloride). The contents of the filter were gently agitated and the aqueous phase was filtered off. The cake was washed with small batches of water totalling 4 liters, and then was again aspirated dry. The cake was then placed in a glass tray and dried overnight in a vacuum oven at 80° C. The product, which weighed 211 g (85.8%) after drying, was N,N'-iso-phthaloyl bis(valerolactam), which had a melting point of 163°–164° C.

The crude products obtained by the foregoing procedures may contain varying amounts of carboxyl groups. The carboxyl groups are believed to derive from isophthalic acid or the isophthaloyl monolactam and may influence the final polymer composition. The content of carboxyl groups can be reduced by washing the crude product with aqueous base, e.g., dilute aqueous sodium carbonate solution, or by washing them with methanol or ethanol. A bis(lactam) containing virtually no carboxyl groups can be produced by recrystallizing from a suitable solvent, e.g., tetrahydrofuran, methyl ethyl ketone or acetone for IBC, and acetonitrile/methanol or methyl ethyl ketone for IBV. In the examples that follow, the N,N'-isophthaloyl bis (lactam) monomers with the indicated carboxyl levels were obtained by treating the crude lactam monomer in this manner. The carboxyl levels can be determined readily by titration procedures well-known in the art.

Polymerization of N,N'-Isophthaloyl Bis(lactam) Monomers with Diamines

The isophthaloyl bis(lactam) monomers are polymerized with aromatic diamines as shown above. The polymerization is carried out at temperatures above 180° C., preferably between 220° C. and 280° C. It has been found that removal of some lactam by application of vacuum during a portion of the polymerization will enable the production of higher molecular weight polymers than otherwise. The polymers were then ground and washed in boiling methanol and dried in a vacuum oven at about 100° C. prior to making the nuclear magnetic resonance, NMR, and Tg measurements. Polymers of fiber forming molecular weight, inherent viscosity of at least 0.7, are prepared. Measurements were made as described below. The polymers may contain amounts of the lactam formed in situ from the bis(lactam) starting material. Presence of the lactam plasticizes the polymer and renders it more amenable to melt-processing. If desired, however, substantially all of the in situ produced lactam may be removed by extraction procedures.

Test Methods

Carboxyl Determination of Isophthaloyl Bis-Lactams

The carboxyl level in isophthaloyl bis-lactams is determined by the titration method described by G. B. Taylor and J. E. Waltz in *Anal. Chem.*, 19, 448 (1948).

Determination of Polymer Composition

Determinations of the composition of the copolymers of this invention are made by determining the proton-NMR spectra of samples of the copolymers in deuterated dimethyl sulfoxide (DMSO-$d_6$). A copolymer sample to be tested is first ground into particles, if it is not already in finely divided form, and then thoroughly washed in boiling methanol to remove any material soluble in methanol, such as free lactam compounds. The sample should be washed at least twice in boiling methanol, each time for at least 30 minutes, using at least about 8 ml of methanol per g of sample. After the sample is washed, it is dried in a vacuum oven at: 100° C. for at least 3 hours. The proton-NMR spectrum of the sample in a DMSO-$d_6$ solution is then recorded, using a Nicolet NT-300 spectrometer or the equivalent. The relative molar amounts of aliphatic and aromatic portions in &:he copolymer are then determined by integrating the areas under the -NH-proton absorption curves for the portions of the curves which are characteristic, respectively, for the aliphatic and the aromatic amide -NH-protons, and comparing them in turn with the total area of -NH-proton absorption. The areas to be integrated usually appear, expressed in chemical shifts in parts per million (ppm), at portions of the curve corresponding to:

Aromatic amide —NH— protons = 10.67 to 10.30 ppm (area "A")
Aliphatic amide —NH— protons = 10.06 to 9.82 ppm (area "B")

Aliphatic amides are defined as those amide groups in which either the nitrogen atom or the carbonyl group, or both, are attached to an aliphatic carbon atom. Aromatic amides are defined as those amide groups in which both the nitrogen atom and the carbonyl group are attached to aromatic carbon atoms. The following approximate formulas are used to calculate the amount of the aliphatic component in the copolymer, e.g. —(C=O)—(CH$_2$)$_5$—NH— for the component derived from caprolactam, in wt.% or in mol%:

$$\text{Wt. \% of aliphatic component} = \frac{100}{1 + \frac{FW_a}{2FW_b} \times \frac{A}{B}}$$

$$\text{Mol \% of aliphatic component} = \frac{100}{1 + \frac{A}{2B}}$$

where A and B are defined above,
FW$_a$=Formula weight of aromatic amide repeat unit, e.g. for —HN—C$_6$H$_4$—O—C$_6$H$_4$—NH—(C=O)—C$_6$H$_4$—(C=O) , FW$_a$=330, and
FW$_b$=Formula weight of aliphatic repeat unit, e.g. for —(C=O)—(CH$_2$)$_5$—NH—, FW$_b$=113.

Determination of Glass Transition Temperature

The glass transition temperature, $T_g$, of a copolymer is determined by subjecting a sample of the copolymer to a Differential Scanning Calorimeter (DSC) Test in the manner described in U.S. Pat. No. 4,501,886 to J. P. O'Brien, col. 4, lines 10–25, except that a Du Pont 2100 Thermal Analyzer was used and the transition in the range of about 180° C.–250° C. is taken as the $T_g$ of the sample of copolymer.

Inherent Viscosity

The inherent viscosity of a polymer which is soluble in a suitable solvent is conventionally used as a measure of the degree of polymerization of the polymer and is defined as $$\eta inh = \frac{\ln(t/t_o)}{C}$$

measured by determining the flow times of a solution of the polymer at a concentration C in a capillary viscometer at a temperature of 25° C., where t is the flow time of the solution and $t_o$ is the flow time of the solvent alone. With the copolymers of the invention, the inherent viscosity values were determined using a solution of 4 wt.% lithium chloride (LiCl) in dimethylacetamide (EMAc) as the solvent, in which the copolymer sample was dissolved at a concentration of about 0.5 g of the copolymer per 100 ml of the solvent. The following examples are illustrative of this invention and are not intended as limiting:

EXAMPLE 1

In this example IBC was reacted with 3,4'-DDE. Caprolactam was liberated during the polymerization reaction, and some was distilled from the mixture while the reaction was in progress The copolymer which formed was plasticized by the remaining caprolactam and was melt spun into fibers.

The polymer was prepared in a glass tube reactor fitted with a distillation condenser. The following amounts of ingredients were charged into the reactor: 17.80g (0.05 mol) IBC containing 7.3 micro- equivalents (meq.) of carboxyl per g., and 10.00 g (0.05 mol) 3,4'-DDE. The reaction mixture was thoroughly purged using a N₂/vacuum cycle, and then under a reduced pressure of 27 mm of Hg was heated in a Wood's metal bath at 250° C. The mixture melted and after a few minutes caprolactam started to distill. After 5.5 g (50% of theoretical) of caprolactam was collected, nitrogen was introduced at atmospheric pressure and the reaction mixture was maintained at 250° C. under nitrogen for 6 hours. The result was a clear light yellow plug of copolymer, plasticized

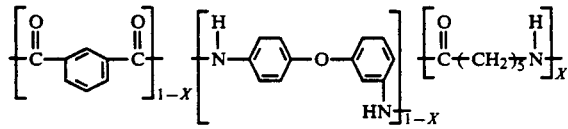

with residual caprolactam. The reaction tube was allowed to cool to room temperature and the plug of plasticized copolymer was isolated by breaking the tube. About 3g of the plug was ground into particles and washed twice in 200 ml of boiling methanol, each time for 1.5 hours to extract caprolactam and other methanol-soluble materials, the washed copolymer was dried in a vacuum oven at 110° C. for 3 hours. The inherent viscosity was 1.31. Its Tg (by DSC) was 211.9° C. The composition of the plasticized polymer was established by proton-NMR spectrum as follows:

Copolymer: Aramid repeat units = 72.5 wt. %
(79.5 mol % of copolymer)

$$\overset{O}{\underset{\|}{-C}}-(CH_2)_5NH \text{ repeat units} = 7.8 \text{ wt. \%}$$
(19.9 mol % of copolymer)

Free Caprolactam = 19.7 wt. %

Another portion of the plasticized polymer was pressed into a plug at 125° C./5000 psi/5 min., and was spun at 290° C. using a five-hole spinneret. The spun yarn denier was 97, its tenacity (T) was 0.66 gpd, and its elongation (E) was 170.0%.

EXAMPLE 2

In this example, IBC was reacted with 3,4'-DDE in an autoclave equipped with a stirrer. The liberated caprolactam was not distilled off while the reaction was in progress. The resulting polymer was shaped into a film.

The polymer was prepared as follows:

2848g (8.0 mol) of IBC containing 16 meq. of carboxyl per g. and 1600 g (8.0 mol) of 3,4'-DDE were charged into the autoclave. The autoclave was thoroughly purged with N₂, closed, and then heated After 1 hr., the temperature had reached 170° C. and the agitator was started at 20 rpm. In another hour, the temperature reached 250° C. and the pressure inside the autoclave was 80 psi. At this point, the agitator speed was reduced to 6 rpm, the temperature was held at 250° C., and the autoclave pressure reduced to atmospheric over a period of 1.5 hr. After 30 min., agitation was stopped and the copolymer allowed to pool at bottom of the autoclave for about 15 minutes. It was then extruded as a ribbon under N₂ and quenched in a bath of water. About 20 g. of the solidified copolymer

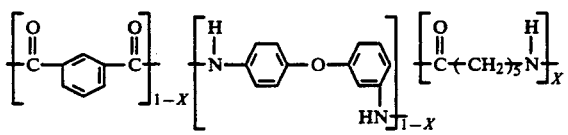

in solution with residual caprolactam was ground and extracted twice in 300 ml of boiling methanol, each time for 3 hrs. The extracted polymer was dried in a vacuum oven at 100° C. for 24 hours. Its inherent viscosity was measured to be 0.86. Its proton-NMR spectrum showed 13.6% (31.5 mol %) of —(C=O)—(CH₂)₅—NH— repeat units in the copolymer chain, i.e. X was 0.315.

The remainder of the plasticized copolymer 3.86 kg (8.5 lbs.) was cut into particles of approximately 1.6 mm and extracted with 38 liters of methanol by essentially the same procedure as above. The extracted polymer was then dried in a vacuum oven at 100° C. for 24 hours. It was then extruded into clear films ranging in thickness from 0.7 to 9 mils. One film (~5.5 mil thickness) was biaxially oriented 2× in each direction at 200° C., to a thickness of about 1.37 mil. Its tensile properties are described in the following table:

TABLE

| | |
|---|---|
| Ten | 13.8 Kpsi (95.2 MPa) |
| Elong., | 26.3% |
| Mod., | 614 Kpsi (4237 MPa) |

EXAMPLE 3

This example demonstrates the use as a thermoplastic molding resin, a similar polymer to that of Example 2 prepared from the same ingredients in an analogous manner. The IBC contained 7.3 meq. of carboxyl per g. Some of the caprolactam liberated was distilled from the mixture while the reaction was in progress, similar to Example 1. The remaining caprolactam was extracted from the polymer before compression molding. The polymer inherent viscosity was 1 01. Its proton-NMR spectrum showed 8.6% (21.6 mol %) of

repeat units in the polymer chain, i.e. X was 0.22. Its Tg (by DSC)=207.9° C.

The extracted polymer was compression molded at 305° C./1380 psi/15 min into 15.2 cm×15.2 cm plates having a thickness of 3.175 mm. Their static tensile properties are given in the Table below.

TABLE

| Strength | 12.4 Kpsi (85.5 MPa) |
|---|---|
| Young's Modulus | 560 Kpsi (3861 MPa) |
| Poisson's Ratio | 0.3 |
| Shear Modulus | 215 Kpsi (1482 MPa) |

EXAMPLE 4

In this example, IBV was reacted with 3,4'-DDE with liberation of valerolactam to form a copolymer plasticized by some of the valerolactam. The copolymer was extracted with methanol to remove the free lactam and the methanol-extracted copolymer was melt spun into strong fibers which could be drawn to increase their strength and modulus.

A quantity of 3,4'-DDE was reacted with IBV in such a manner that the valerolactam liberated during the reaction was not distilled from the mixture while the reaction was in progress.

Into a glass tube reactor, fitted with a mechanical glass stirrer, was placed 6 56 g (0.02 mol) of IBV containing 14.9 meq of carboxyl per g and 4.00 g (0.02 mol) of 3,4'-DDE. The reaction mixture was thoroughly purged, using a nitrogen/vacuum cycle; then, while under nitrogen, it was heated in a Wood's metal bath at 250° C. As soon as the mixture melted, the stirring was started. The reaction mixture became quite viscous over a period of 90 minutes. The reaction mixture was cooled to room temperature. The product was a clear plug of plasticized copolymer

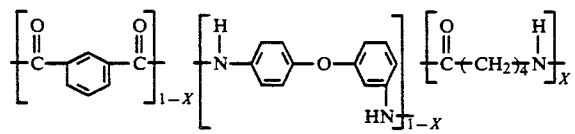

(3,4'-DDE-I/5) in solution with residual valerolactam. The plug was ground into particles and the particulate copolymer was washed three times in boiling methanol, using 200-ml quantities of methanol and boiling for 2 hours each time to extract valerolactam and any other methanol-soluble materials. The washed product was then dried in a vacuum oven at 100° C. for 3 hrs. This product was white and had an inherent viscosity of 0.70. Its proton-NMR spectrum showed 4.9 wt. % (14.66 mol %) of —C—(CH$_2$)$_4$—NH— repeat units in the copolymer chain, i.e. X=0.15. Its glass transition temperature, Tg, was determined by a DSC Test to be 225° C.

Another polymerization was carried out, using substantially the same procedure, except that some of the valerolactam generated during the polymerization was distilled out under vacuum.

Into a glass tube reactor, fitted with a stainless steel helical stirrer and a distillation condenser, was placed a mixture of 60.0 g (0.3 mol) of 3,4'-DDE and 98.4g (0.3 mol) of IBV containing 28.6 meq of carboxyl per g. To this mixture was added 0.0197g of phenylphosphinic acid as an anti-oxidant. The system was purged thoroughly using a nitrogen/vacuum cycle and then put under a vacuum of 70 mm of mercury. It was then heated in a Wood's metal bath at 250° C. The mixture melted and valerolactam began to distill from the mixture After 20.4 g of valerolactam (34.3% of the theoretical amount of 59.4g of valerolactam in the total mixture) was collected in the receiver, the reaction mixture was placed under nitrogen and the mixture was stirred for 90 minutes. It was then cooled to room temperature. The result was a clear plug of 3,4'-DDE-I/5 copolymer in solution with residual valerolactam. The plug was isolated by breaking the tube. The plug was ground into particles and the particulate copolymer was washed three times in boiling methanol, using 800-ml quantities of methanol and boiling for 2 hours each time to extract valerolactam and any other methanol-soluble materials. The washed product was then dried in a vacuum oven at 100° C. for 12 hours. This product had an inherent viscosity of 0.71. Its proton-NMR spectrum showed 4.4–5.3 wt. % of

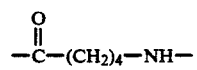

repeat units, in the copolymer chain. Its glass transition temperature, Tg, was determined by a DSC Test to be 224.1° C.

About 40 g of the copolymer prepared and methanol extracted as described in the previous paragraph was pressed into a plug at 289° C. for 5 minutes. The plug was melt spun at 325° C., using a five-hole spinneret, into a 165 dtex (150 denier), 5-filament yarn. Its tenacity as-spun was 2.45 g/dtex (2.7 gpd), its elongation was 90%, and its modulus was 30 g/dtex (33 gpd). Upon drawing 1.3X at 200° C., its tenacity was 2.9 g/dtex (3.2 gpd), its elongation was 72% and its modulus was 37.3 g/dtex (41 gpd).

EXAMPLE 5

In this example, a mixture of 3,4'-DDE (50 mol%) and MPD (50 mol%) is reacted with IBC to form a copolymer.

Into a glass tube reactor, which was not fitted with a stirrer, was placed 7.12g (0.02 mol) of IBC containing 8 meq of carboxyl per g and a mixture of 1.08 g (0.01 mol) of m-phenylenediamine (MPD) and 2.00 g (0.01 mol) of 3,4'-DDE. The reaction mixture was thoroughly purged, using a nitrogen/vacuum cycle; then, while under nitrogen, it was heated in a Wood's metal bath at 250° C. As soon as the mixture melted, the mixture was manually shaken to mix the ingredients. The mixture was then left under nitrogen for 6 hours. The reaction mixture remained clear during this time. The mixture was then cooled to room temperature. The product was a plasticized copolymer

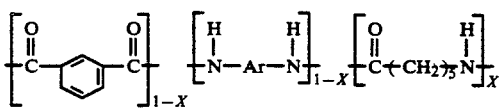

(3,4'-DDE/MPD-I/6) in solution with residual caprolactam. The plasticized copolymer was ground into particles and the particulate copolymer was washed twice in boiling methanol, using 200-ml quantities of methanol and boiling for three hours each time to extract caprolactam and any other methanol-soluble materials. The washed product was then dried in a vacuum oven at 100° C. for 3 hours. The product had an inherent viscosity of 0.73. Its proton-NMR spectrum showed 16.6 wt.% (33.3 mol %) of —C(=O)—(CH$_2$)$_5$—NH— repeat units in the copolymer chain, i.e. X=0.33. Its glass transition temperature, T$_g$, was determined by a DSC Test to be 203.5° C.

EXAMPLE 6

In this example IBC was reacted with a mixture of 3,4'-DDE and PPD in a glass tube reactor without removing caprolactam liberated in the reaction until the polymerization was completed. The following amounts of ingredients were charged into the reactor: 7 12 g (0.02 mol) of IBC containing 48.9 meq of carboxyl per g, 2.00 g (0.01 mol) of 3,4'-DDE, and 1.08 g (0.01 mol) of PPD. The mixture was thoroughly purged using several N$_2$/vacuum cycles. The reactants were heated in a Wood's metal bath at 250° C. The mixture melted into a clear, light yellow liquid. Stirring of the reactants was begun as soon as the mixture melted. In about 15 minutes the reaction mixture got quite thick and began to ball around the stirrer. The reaction was stopped after 1 hr. While molten the reaction product, 3,4'-DDE/PPD (50/50)-I/6 copolymer, could be pulled into films. A quantity of the product was ground into particles and the particulate copolymer was washed twice in boiling methanol to extract the free caprolactam, using 200-ml quantities of methanol and boiling for 30 min. each time. The resulting product had an inherent viscosity of 0.77.

EXAMPLE 7

In this example IBV with a low carboxyl content was reacted with 3,4'-DDE to give a copolymer with very low aliphatic content. After removal of excess lactam, strong fibers were prepared.

Into a large glass polymer tube was placed 40.05 g (0.2 mol) of 3,4'-DDE and 65.81 g (0.2004 mol, 1.002 equiv.) of IBV with 1.3 meq carboxyl per g. The tube was sealed with a vacuum distillation apparatus and a down-pumping stainless steel helical stirrer. The reactor was purged thoroughly by cycling between vacuum and nitrogen, and put under a vacuum of 70 mm of mercury. The tube was immersed in a Wood's metal bath set at 250° C. and stirring was started at low speed. A quantity of 16 mL (17 g, 43 %) valerolactam was vacuum distilled from the initial melt. The copolymer was stirred for 1.5 hours until the stirrer halted as it became very viscous. The copolymer was then held for 2.5 hours at the same temperature and pressure. The stirrer was slowly removed at the end of the run, so that the copolymer could drain into a plug. The reactor was removed from the bath, cooled to room temperature, and immersed in dry ice to shatter the tube to collect the plug.

After extraction of free lactam the copolymer, 3,4'-DDE-I/5, had an inherent viscosity of 1.26 and a T$_g$ of 236.37° C. Its proton NMR spectrum showed that the copolymer was free of valerolactam and contained 2.35 wt % (7.41 mol %) of —C(=O)—(CH$_2$)$_4$—NH— repeat units in the copolymer chain, i.e. X was 0.074.

A small plug (5-10 g) of the lactam-free copolymer was melt spun at 335° C., using a one-hole spinneret. The asspun monofilament of 41.4 dtex (37.6 denier) had a tenacity of 3.01 g/dtex (3.31 gpd), its elongation was 127%, and its modulus was 27.3 g/dtex (30.0 gpd). Upon drawing 17× at 200° C., the 22.0 dtex (20.0 denier) monofilament had a tenacity of 3.8 g/dtex (4.18 gpd), its elongation was 11.4 %, and its modulus was 61.9 g/dtex (68.1 gpd). Upon drawing 2.5× at 220° C. the 15.1 dtex (13.6) denier monofilament had a tenacity of 4.23 g/dtex (4.65 gpd), its elongation was 22.5 %, and its modulus was 52 0 g/dtex (57.2 gpd).

Another sample of the copolymer was prepared using the same general procedure, except that a few grams of the plasticized copolymer from which the valerolactam had not been extracted was press spun at 290° C. through a 0.23 mm (9 mil) orifice to give a plasticized 29.0 dtex (26.4 denier) monofilament. The plasticized copolymer which was spun contained approximately 35 wt. % valerolactam. At maximum load the monofilament had a tenacity of 0.45 g/dtex (0.5 gpd) and 2.88 % elongation. Its tenacity and elongation at break were 0.29 g/dtex (0.317 gpd) and 45.1 %. Its modulus was 16.5 g/dtex (18.1 gpd). When the valerolactam was extracted from a portion of this polymer, it had an inherent viscosity of 0.98, a T$_g$ of 233.8° C., and contained 2 43 wt % (7.66 mol %) of —C(=O)—(CH$_2$)$_4$—NH— repeat units in the copolymer chain, i.e. X was 0.08.

EXAMPLE 8

In this example, a mixture of MPD and PPD was reacted with IBC to form a polymer.

Into a glass tube was placed 5.0g of IBC, 1.06g of MPD and 0.46g of PPD. The reaction mixture was purged with nitrogen and the tube was sealed with a polytetrafluoroethylene lined screw cap. The tube was placed in a 4 inch high aluminum block preheated to 250° C. and was heated for 4 hours. As soon as the mixture melted, the tube was shaken to mix the ingredients.

The polymers formed were either clear or very slightly hazy. After extraction of the free lactam, the polymers had inherent viscosities of between 0.6 and 0.9.

The polymers were studied under the microscope at 100× magnification. Two showed no crystals, and the remaining samples showed only a small number of spherulites.

EXAMPLE 9

In this example, a mixture of MPD and PPD was reacted with IBV to form a polymer.

The procedure is similar to that of Example 8, except that 5.0 g of IBV, 1.15 g of MPD and 0.49 g of PPD were used.

The polymer formed was clear After extraction of the free lactam, the inherent viscosity of the polymer was 0.6.

The polymer was studied under the microscope at 100× magnification. Only a few spherulites were observed.

EXAMPLE 10

In this example, a mixture of 4,4'-DDE and MPD was reacted with IBC to form a polymer.

The procedure is similar to that of Example 8, except that 5.0g of IBC, 1.97g 4,4'-DEE, and 0.46g MPD were used. The reaction was repeated twice.

All three of the polymers formed were clear. The inherent viscosities, determined after extraction of free lactam, ranged from 0.7 to 0.9. No crystals were seen in the polymer plug under the microscope.

EXAMPLE 11

In this example, a mixture of 4,4'-DDE and MPD was reacted with IBV to form a polymer.

The procedure is similar to that of Example 8, except that 5.0g IBV, 2.13g 4,4'-DDE, and 0.49g MPD were used.

The plug formed was slightly hazy. The inherent viscosity of the isolated polymer was 0.7. Under the microscope, a few small crystals were seen in the amorphous region.

EXAMPLE 12

In this example, a mixture of MPD (70 mol %) and PPD (30 mol %) is reacted with IBC to form a copolymer.

The polymer was prepared in a 2 liter resin kettle fitted with a stirrer, heating mantle, and continuous nitrogen flow. IBC (862.5 g, 2.4 mol) was placed in the kettle. After purging with nitrogen, heating was started. When the IBC was completely melted, MPD (183.2 g, 1.7 mol) and PPD (78.5 g, 0.73 mol) were added, and stirring was started. The mixture was heated to 250° C. and regulated between 250° and 260° C. for 4 hours. The clear amber polymer produced was allowed to cool to room temperature. The inherent viscosity of the polymer after lactam extraction was 0.8, and the Tg was 217° C. The aliphatic content was 31 mol % as determined by proton NMR.

The plasticized polymer was spun into a fiber using a press spinning apparatus.

EXAMPLE 13

In this example, a mixture of 4,4'-DDE (75 mol %) and 3,4'-DDE (25 mol %) was reacted with IBV to form a polymer.

The procedure is similar to that of Example 8, except that 5.0 g of IBV, 2.29 g of 4,4'-DDE, and 0.76 g of 3,4'-DDE were used The mixture was heated for 3 hours.

The polymer formed was observed under the microscope at 100X magnification. Few spherulites were observed.

EXAMPLE 14

In this example, a mixture of 4,4'-DDE (80 mol %) and 3,4'-DDE (20 mol %) was reacted with IBC to form a polymer.

The procedure is similar to that of Example 13, except that 5.0 g of IBC, 2.25 g of 4,4'-DDE, and 0.56 g of 3,4'-DDE were used.

The polymer was observed under the microscope at 100X magnification. Few spherulites were seen.

EXAMPLE 15

In this example, a mixture of MPD (70 mol %) and 3,4'-DDE (30 mol %) is reacted with IBV to form a polymer.

The procedure is similar to that of Example 13, except that 5.0 g of IBV, 1.15 of MPD, and 0.91 g of 3,4'-DDE were used.

A clear polymer was obtained, and no spherulites were seen under the microscope.

EXAMPLE 16

In this example, a mixture of 4,4'-DDE (65 mol %) and PPD (35 mol %) is reacted with IBC to form a polymer.

The procedure is similar to that of Example 13, except that 5.0 g of IBC, 1.83 g of 4,4'-DDE, and 0.53 g of PPD were used.

A clear polymer was obtained, and no spherulites were seen under the microscope.

EXAMPLE 17

In this example, a mixture of 3,4'-DDE (70 mol %) and PPD (30 mol %) is reacted with IBV to form a polymer.

The procedure is similar to that of Example 13, except that 5.0 g of IBV, 2.13 g of 3,4'-DDE, and 0.49 g of PPD were used.

A clear polymer was obtained and no spherulites were seen under the microscope.

We claim:

1. An amorphous melt-processible polyamide having an inherent viscosity of at least 0.5 determined at 25° C. using a solution of a 0.5 g of polymer per 100 ml of a solution of 4 wt. % LiCl in dimethylacetamide and consisting essentially of the following repeat units:

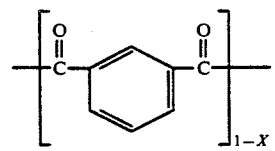

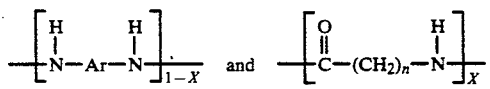

wherein n is 4 or 5; with the proviso that when n is 4, X is from 0.05 to 0.25, and, when n is 5, X is from 0.1 to 0.45; and when n is 4, Ar is selected from the group consisting of a) 3,4'-oxydiphenylene or a mixture thereof with up to b 75 mol percent of 1,3-phenylene or 4,4'-oxydiphenylene or with up to 35 mol percent of 1,4-phenylene;

b) a mixture of from 65 to 75 mol percent 1,3-phenylene and from 25 to 35 mol percent of 1,4-phenylene;

c) a mixture of 20 to 80 mol percent 4,4'-oxydiphenylene and from 20 to 80 mol percent of 1,3-phenylene; and when n is 5, Ar is selected from the group consisting of a) 3,4'-oxydiphenylene or a mixture thereof with up to 80 mol percent of 4,4'-oxydiphenylene, up to 90 mol percent of 1,3-phenylene, or up to 50 mol percent of 1,4-phenylene;

b) a mixture of 50 to 90 mol percent 1,3-phenylene and 10 to 50 mol percent of 1,4-phenylene;

c) a mixture of 10 to 90 mol percent 1,3-phenylene and 10 to 90 mol percent of 4,4'-oxydiphenylene; and d) a mixture of 60 to 75 mol percent 4,4'-oxydiphenylene and 25 to 40 mol percent of b 1,4-phenylene.

2. A polyamide according to claim 1 having an inherent viscosity of at least 0.7.

3. A polymer according to claim 1 wherein n is 4, X is from 0.05 to 0.25 and Ar is selected from the group consisting of 3,4'-oxydiphenylene and mixtures thereof with up to 75 mol percent of 1,3-phenylene or 4,4'-oxydiphenylene or with up to 35 mol percent of 1,4-phenylene.

4. A polymer according to claim 1 wherein n is 4, X is from 0.05 to 0.25 and Ar is a mixture of from 20 to 80 mol percent 4,4'-oxydiphenylene and from 20 to 80 mol percent of 1,3-phenylene 5. A polymer according to claim 1 wherein n is 4, X is from 0.05 to 0.25 and Ar is a mixture of from 65 to 75 mol percent 1,3-phenylene and from 25 to 35 mol percent of 1,4-phenylene.

6. A polymer according to claim 1 wherein n is 5, X is from 0.1 to 0.45 and Ar is selected from the group consisting of 3,4'-oxydiphenylene or a mixture thereof with up to 80 mol percent of 4,4'-oxydiphenylene, up to 90 mol percent of 1,3-phenylene, or up to 50 mol percent of 1,4-phenylene.

7. A polymer according to claim 1 wherein n is 5, X is from 0.1 to 0.45 and Ar is a mixture of 60 to 75 mol percent 4,4'-oxydiphenylene and 25 to 40 mol percent of 1,4-phenylene.

8. A polymer according to claim 1 wherein n is 5, X is from 0.1 to 0.45 and Ar is a mixture of 10 to 90 mol percent 1,3-phenylene and 10 to 90 mol percent of 4,4'-oxydiphenylene.

9. A polymer according to claim 1 wherein n is 5, X is from 0.1 to 0.45 and Ar is a mixture of 50 to 90 mol percent 1,3-phenylene and 10 to 50 mol percent of 1,4-phenylene.

10. A melt-processible composition consisting essentially of a polyamide of claim 1 plasticized with a lactam of the group consisting of caprolactam and valerolactam.

11. A fiber or film of the polymer of claim 1.

* * * * *